United States Patent [19]
Ohtani et al.

[11] Patent Number: 5,403,797
[45] Date of Patent: Apr. 4, 1995

[54] NON-REDUCING DIELECTRIC CERAMIC COMPOSITION

[75] Inventors: Osamu Ohtani; Wataru Takahara, both of Akita, Japan

[73] Assignee: TDK Corporation, Tokyo, Japan

[21] Appl. No.: 187,103

[22] Filed: Jan. 21, 1994

[30] Foreign Application Priority Data

Jan. 21, 1993 [JP] Japan .................................. 5-008304

[51] Int. Cl.$^6$ .............................................. C04B 35/46
[52] U.S. Cl. ...................................... 501/138; 501/139
[58] Field of Search ................................ 501/138, 139

[56] References Cited

U.S. PATENT DOCUMENTS

| | | | |
|---|---|---|---|
| 4,115,493 | 9/1978 | Sakabe et al. | 264/61 |
| 4,241,378 | 12/1980 | Dorrian | 361/305 |
| 4,855,266 | 8/1989 | Burn | 501/138 |
| 4,925,817 | 5/1990 | Ikeda et al. | 501/138 |

*Primary Examiner*—Mark L. Bell
*Assistant Examiner*—Deborah Jones
*Attorney, Agent, or Firm*—Hecker & Harriman

[57] ABSTRACT

To provide a non-reducing dielectric ceramic composition for multilayer ceramic capacitor, in which decrease of specific resistance and shortening of life time do not occur due to reduction of dielectric ceramic composition even when it is fired in neutral or reducing atmosphere and capacitance does not vary extensively due to temperature change, the non-reducing dielectric ceramic composition according to the present invention comprises 86.32 to 97.64 mols of $BaTiO_3$, 0.01 to 10.00 mols of $Y_2O_3$, 0.01 to 10.00 mols of MgO, and 0.001 to 0.200 mol of $V_2O_5$. An additive containing 0.01 to 1.0 mol % of at least one or more of MnO, $Cr_2O_3$, or $Co_2O_3$, and further, an additive containing 0.5 to 10.0 mol % of $\{Ba_A, Ca_{(1-A)}\}SiO_3$ (where $0 \leq A \leq 1$) may be added.

4 Claims, 2 Drawing Sheets

NON-REDUCING DIELECTRIC CERAMIC COMPOSITION

FIELD OF THE INVENTION

The present invention relates to a non-reducing dielectric ceramic composition, and in particular to a non-reducing dielectric ceramic composition to be used in multilayer ceramic capacitor, in which a base metal such as nickel is used as internal electrode.

BACKGROUND OF THE INVENTION

With rapid propagation of various types of electronic devices, there is a tendency that these devices are increasingly produced in compact and lightweight design. In particular, this tendency toward compact and lightweight design is more remarkable in the electronic devices of portable type to be used in camera-integrated video tape recorder, portable telephone set, note-book personal computer, palm-top computer, etc.

In such tendency toward compact and lightweight electronic products, the component parts for these devices are also increasingly produced in compact and lightweight design. The means to mount the electronic components are also changing from the technique for inserting and soldering pins, i.e. electronic parts, to be used in through-hole on conventional type printed board to surface mounting technology (SMT), i.e. the technique for mounting and soldering electronic parts on land of electro-conductive pattern on printed board.

The electronic parts used in this SMT are generally called surface mounting devices (SMD). Not only semiconductor components, but also capacitor, resistor, inductor, filter, etc. are included in them. Among them, small components such as capacitor and resistor are called chip components. The most representative of them is multi-layer ceramic capacitor.

FIG. 1 shows a partially cutaway perspective view showing structure of a multilayer ceramic capacitor.

The multilayer ceramic capacitor 1 is in form of rectangular parallelopiped, and terminal electrodes 3 and 4 are mounted on a pair of opposed surfaces of multilayer ceramic capacitor body 1, which is in form of rectangular parallelopiped.

In the multi layer ceramic capacitor main unit 2, four internal electrodes 5, 6, 7 and 8 are formed among laminated $BaTiO_3$ dielectric layers 9, 10 and 11, and dielectric material layers 12 and 13 made of dielectric material are laminated on upper surface of the internal electrode 5 and lower surface of the internal electrode 8.

Every other of the internal electrodes 5, 6, 7 and 8 are connected to terminal electrodes. That is, the internal electrodes 6 and 8 are connected to a terminal electrode 4, and the internal electrodes 5 and 7 are connected to another terminal electrode 3. As a result, a capacitor is formed, which is connected in parallel between the internal electrodes 5 and 6, between the internal electrodes 6 and 7, and between the internal electrodes 7 and 8.

Each of the terminal electrodes 3 and 4 comprises a conductive layer, on which conductive paste containing glass frit is coated or printed and baked, and a plated layer coated on it or a metal cap press-fitted on it.

To manufacture multilayer ceramic capacitor, electrode paste to serve as an internal electrode is printed on a dielectric ceramic composition sheet, a plurality of such sheets are laminated and thermally pressed, the laminated product thus prepared is sintered in the air and a terminal electrode is mounted on it.

In this manufacturing method, the electrode paste to serve as the internal electrode of the capacitor and the dielectric ceramic composition are fired at the same time. For this reason, the material to be used as the internal electrode must have such property that the electrode is formed at the sintering temperature of the dielectric ceramic composition and there occurs no oxidation or no reaction with the dielectric ceramic composition when heated in the air.

As the material to meet the above requirements, noble metal such as platinum, palladium, etc. have been used in the past. However, these noble metals are very expensive and constitute major cause for the high cost of the multilayer ceramic capacitors.

In this connection, attempts have been made to use base metal such as nickel as internal electrode, while nickel is oxidized when it is fired in oxidizing atmosphere and also reacts with the dielectric ceramic composition. This hinders the formation of electrode.

A method to fire nickel in non-oxidative atmosphere to prevent oxidation is disclosed in the specification of U, S. Pat. No. 4,241,378, while, in this method, dielectric ceramic composition is reduced and specific resistance is extremely lowered. Thus, it is not suitable for the practical use as capacitor.

As a dielectric ceramic composition having satisfactory dielectric property such as dielectric constant (relative permitivity), $BaTiO_3$ dielectric ceramic composition containing $CaZrO_2$, $MnO$, etc. is disclosed in Japanese Patent Laid-Open Publication 62-2408, whereas this dielectric ceramic composition is fired in non-oxidizing atmosphere when it is reduced and has shorter life time.

The multilayer ceramic capacitor is manufactured through the following processes.

(1) Raw materials are weighed and blended so that composition after firing complies with the predetermined blending ratio.

(2) Wet mixing and pulverizing are performed.

(3) Dehydration and drying are performed.

(4) Adequate quantity of organic binder is added, and it is mixed and turned to enameled.

(5) This is coated on film by doctor blade method to form dielectric ceramic composition sheet.

(6) On the dielectric ceramic composition sheet thus prepared, nickel paste to serve as a material for internal electrode is formed by printing.

(7) The product is laminated and thermally pressed to obtain a multilayer product.

(8) The product is cut into a predetermined shape.

(9) Binder removal processing is performed.

(10) While controlling oxygen partial pressure, the product is fired.

(11) Re-oxidation is performed in neutral atmosphere.

(12) Terminal electrode is mounted.

As a non-reducing dielectric ceramic composition having longer life time, a dielectric ceramic composition containing $\{Ba_A, Ca_{(1-A)}\}SiO_3$ (where $0 \leq A \leq 1$) (hereinafter referred as "BCG") as an additive to $BaTiO_3$, $MnO$, and $Y_2O_3$ is disclosed in Japanese Patent Application 3-18261. However, in the multilayer ceramic capacitor produced using this dielectric ceramic composition, capacitance is varied due to temperature change.

In addition to the above, non-reducing dielectric ceramic composition is described in Japanese Patent Laid-Open Publications 61-248304 and 57-71866, U.S. Pat. No. 4,115,493, "Dielectric Materials for Base-Metal Multilayer Ceramic Capacitors" (Proceedings of the Electronics Division Fall Meeting, the American Ceramic Society, Oct. 13-16, 1985) by Y. SAKABE, T. TAKAGI, and K. WAKINO.

SUMMARY OF THE INVENTION

It is an object of the present invention to provide a non-reducing dielectric ceramic composition suitable for producing a multilayer ceramic capacitor, in which decrease of specific resistance and shortening of service life do not occur due to reduction of the dielectric ceramic composition even when nickel to be used for internal electrode is fired in neutral or reducing atmosphere to prevent oxidation, in which capacitance does not vary extensively due to temperature change.

To attain the above object, the non-reducing dielectric ceramic composition comprises 86.32 to 97.64 mols of $BaTiO_3$, 0.01 to 10.00 mols of $Y_2O_3$, 0.01 to 10.00 mols of MgO, and 0.001 to 0.200 mols of $V_2O_5$.

DETAILED DESCRIPTION OF THE PREFERRED EMBODIMENTS

In the following, description will be given on the features of the present invention in connection with embodiments.

Figure 1:
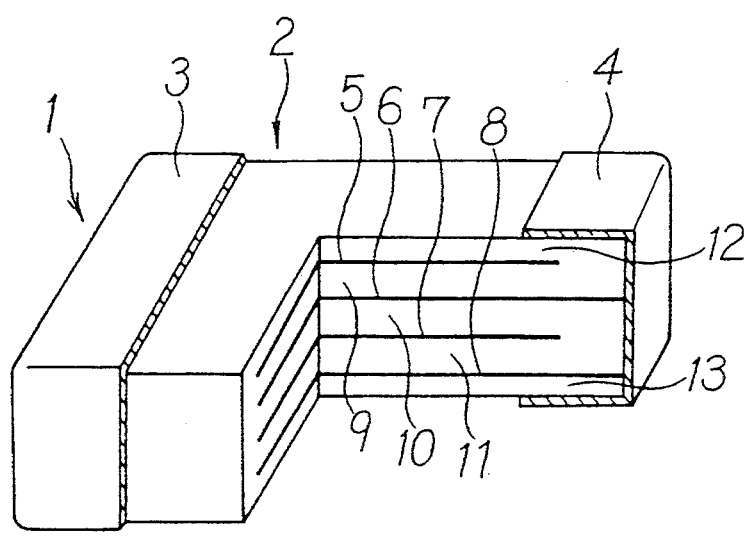
FIG. 1 shows structure of a multilayer ceramic capacitor.
Figure 2:
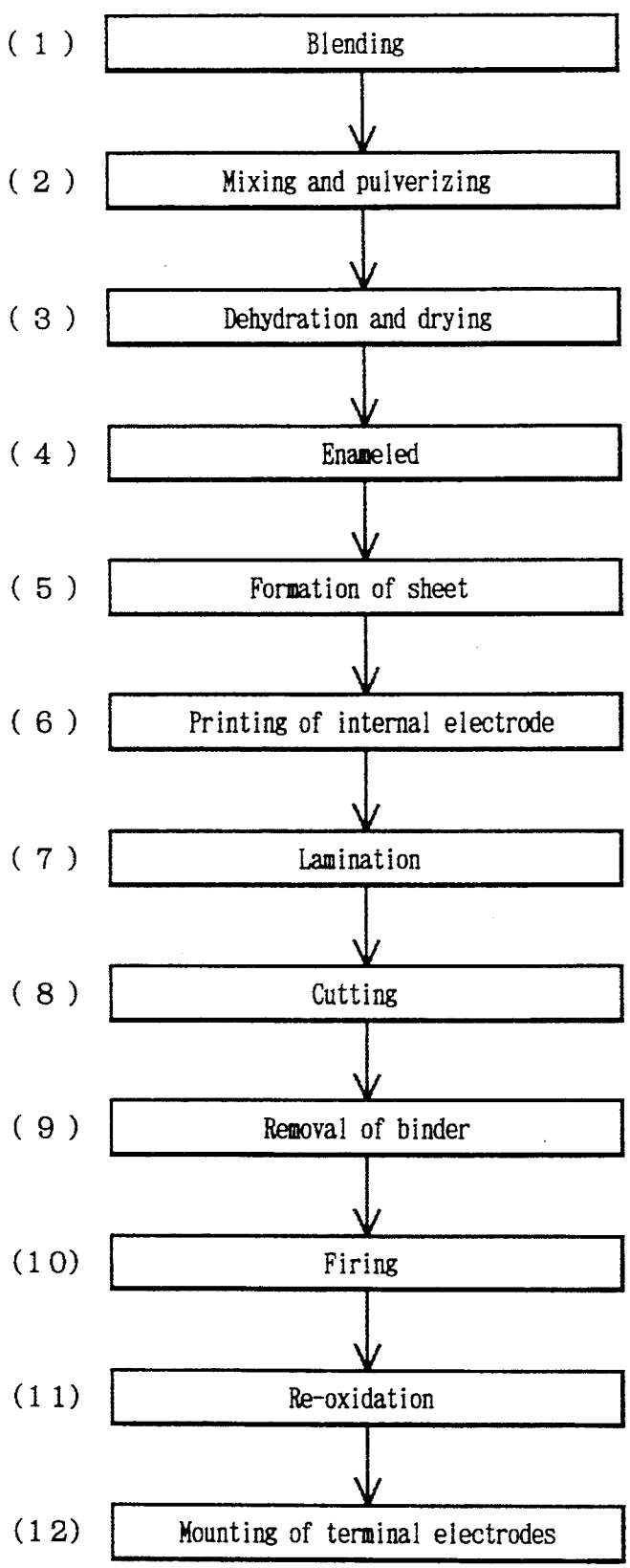
FIG. 2 is a flow chart showing manufacturing process of the non-reducing dielectric ceramic composition.

A flow chart showing manufacturing process of the non-reducing dielectric ceramic composition of the present invention is given in FIG. 2.

(1) $BaTiO_3$, $Y_2O_3$, MgO, $V_2O_5$, MnO, $Co_2O_3$, $Co_2O_3$, etc. are weighed and blended to have the composition after firing as shown in Table 1 and Table 2.

TABLE 1

| | Composition (mol %) | | | | | | | | | Fir'g |
|---|---|---|---|---|---|---|---|---|---|---|
| | | | | | BCG* | | X | Y | Z | X.Y.Z Total | Temp. $T_2$ |
| No. | $BaTiO_3$ | $Y_2O_3$ | MgO | $V_2O_5$ | A | Q'ty | MnO | $Cr_2O_3$ | $Co_2O_3$ | Q'ty | (°C.) |
| 1 | 97.69 | 0 | 0.02 | 0.001 | 0.58 | 1.95 | 0.05 | 0.29 | — | 0.34 | 1400 |
| 2 | 97.54 | 0.20 | 0.02 | 0 | 0.58 | 1.95 | — | 0.29 | — | 0.29 | 1380 |
| 3 | 96.88 | 0.58 | 0.02 | 0 | 0.58 | 1.94 | 0.29 | 0.29 | — | 0.58 | 1380 |
| 4 | 97.04 | 0.58 | 0 | 0.005 | 0.58 | 1.94 | 0.15 | 0.29 | — | 0.44 | 1380 |
| 5 | 96.25 | 0.58 | 0.96 | 0.005 | 0.58 | 1.92 | 0.29 | — | — | 0.29 | 1340 |
| 6 | 96.89 | 0.58 | 0.01 | 0.30 | 0.58 | 1.94 | 0.29 | 0.29 | — | 0.58 | 1340 |
| 7 | 96.61 | 0.58 | 0.01 | 1.00 | 0.58 | 1.93 | 0.29 | 0.58 | — | 0.87 | 1340 |
| 8 | 96.39 | 0.58 | 0.96 | 0.005 | 0.58 | 1.93 | 0.14 | — | — | 0.14 | 1300 |
| 9 | 92.68 | 0.58 | 4.63 | 0.002 | 0.58 | 1.85 | 0.28 | — | — | 0.28 | 1300 |
| 10 | 95.86 | 0.01 | 1.92 | 0.005 | 0.58 | 1.92 | 0.29 | — | — | 0.29 | 1380 |
| 11 | 87.43 | 0.53 | 10.00 | 0.001 | 0.58 | 1.77 | 0.27 | — | — | 0.27 | 1300 |
| 12 | 85.95 | 0.53 | 11.50 | 0 | 0.58 | 1.76 | 0.26 | — | — | 0.26 | 1300 |
| 13 | 96.48 | 0.58 | 0.96 | 0.005 | 0.58 | 1.93 | 0.05 | — | — | 0.05 | 1340 |
| 14 | 96.67 | 0.29 | 0.97 | 0.005 | 0.58 | 1.93 | 0.14 | — | — | 0.14 | 1340 |
| 15 | 97.28 | 0.58 | 0 | 0.001 | 0.58 | 1.95 | — | 0.19 | — | 0.19 | 1320 |
| 16 | 97.45 | 0.58 | 0.02 | 0 | 0.58 | 1.95 | — | — | — | 0 | 1320 |
| 17 | 96.51 | 0.58 | 0.97 | 0.005 | 0.58 | 1.93 | 0.01 | — | — | 0.01 | 1320 |
| 18 | 95.47 | 0.57 | 1.91 | 0.002 | 0.58 | 1.91 | 0.14 | — | — | 0.14 | 1340 |
| 19 | 92.80 | 0.56 | 4.64 | 0.002 | 0.58 | 1.86 | 0.14 | — | — | 0.14 | 1340 |
| 20 | 95.47 | 0.57 | 1.91 | 0.050 | 0.58 | 1.91 | 0.14 | — | — | 0.14 | 1340 |
| 21 | 95.42 | 0.57 | 1.91 | 0.001 | 0.58 | 1.91 | — | 0.19 | — | 0.19 | 1380 |
| 22 | 97.24 | 0.58 | 0.05 | 0.050 | 0.58 | 1.94 | — | 0.19 | — | 0.19 | 1380 |
| 23 | 95.42 | 0.57 | 1.91 | 0.030 | 0.58 | 1.91 | — | 0.19 | — | 0.19 | 1360 |

*BCG: $\{Ba_A, Ca_{(1-A)}\}SiO_3$

TABLE 2

| | Composition (mol %) | | | | | | | | | Fir'g |
|---|---|---|---|---|---|---|---|---|---|---|
| | | | | | BCG* | | X | Y | Z | X.Y.Z Total | Temp. $T_2$ |
| No. | $BaTiO_3$ | $Y_2O_3$ | MgO | $V_2O_5$ | A | Q'ty | MnO | $Cr_2O_3$ | $Co_2O_3$ | Q'ty | (°C.) |
| 24 | 95.42 | 0.57 | 1.91 | 0.003 | 0.58 | 1.91 | — | 0.19 | — | 0.19 | 1360 |
| 25 | 95.42 | 0.57 | 1.91 | 0.010 | 0.58 | 1.91 | — | 0.19 | — | 0.19 | 1360 |
| 26 | 95.48 | 0.57 | 1.91 | 0.240 | 0.58 | 1.90 | 0.14 | — | — | 0.14 | 1360 |
| 27 | 96.53 | 0.39 | 0.96 | 0.190 | 0.58 | 1.93 | — | 0.19 | — | 0.19 | 1360 |
| 28 | 97.26 | 0.58 | 0.01 | 0.002 | 0.58 | 1.95 | — | 0.20 | — | 0.20 | 1320 |
| 29 | 95.05 | 0.95 | 0.90 | 0.002 | 0.58 | 1.91 | — | 0.19 | — | 0.19 | 1360 |
| 30 | 91.58 | 4.58 | 1.83 | 0.002 | 0.58 | 1.83 | — | 0.18 | — | 0.18 | 1340 |
| 31 | 86.32 | 10.00 | 1.75 | 0.005 | 0.58 | 1.75 | — | 0.18 | — | 0.18 | 1340 |
| 32 | 85.39 | 11.00 | 1.72 | 0.001 | 0.58 | 1.72 | — | 0.17 | — | 0.17 | 1340 |
| 33 | 98.14 | 0.59 | 0.98 | 0.001 | 0.58 | 0 | 0.29 | — | — | 0.29 | 1380 |
| 34 | 97.64 | 0.59 | 0.98 | 0.001 | 0.58 | 0.50 | 0.29 | — | — | 0.29 | 1320 |
| 35 | 93.54 | 0.56 | 0.94 | 0.001 | 0.58 | 4.68 | 0.28 | — | — | 0.28 | 1340 |
| 36 | 88.30 | 0.54 | 0.89 | 0.001 | 0.58 | 10.00 | 0.27 | — | — | 0.27 | 1300 |
| 37 | 85.79 | 0.53 | 0.88 | 0.001 | 0.58 | 12.54 | 0.26 | — | — | 0.26 | 1300 |
| 38 | 96.40 | 0.58 | 0.10 | 0.001 | 0.58 | 1.93 | 0.31 | 0.68 | — | 1.00 | 1360 |
| 39 | 92.51 | 0.74 | 0.09 | 0.001 | 0.58 | 5.55 | 0.65 | 0.46 | — | 1.11 | 1360 |
| 40 | 96.11 | 0.58 | 0.96 | 0.001 | 0.58 | 1.92 | — | 0.29 | 0.14 | 0.43 | 1360 |
| 41 | 96.11 | 0.58 | 0.96 | 0.001 | 0.58 | 1.92 | 0.14 | — | 0.29 | 0.43 | 1320 |

TABLE 2-continued

| | Composition (mol %) | | | | | | | | | | Fir'g Temp. $T_2$ (°C.) |
|---|---|---|---|---|---|---|---|---|---|---|---|
| | | | | | BCG* | | X | Y | Z | X.Y.Z Total | |
| No. | BaTiO$_3$ | Y$_2$O$_3$ | MgO | V$_2$O$_5$ | A | Q'ty | MnO | Cr$_2$O$_3$ | Co$_2$O$_3$ | Q'ty | |
| 42 | 97.19 | 0.58 | 0.05 | 0.001 | 0.58 | 1.94 | 0.05 | — | 0.19 | 0.24 | 1360 |
| 43 | 91.85 | 4.58 | 1.83 | 0.002 | 1.0 | 1.83 | — | 0.18 | — | — | 1390 |
| 44 | 91.58 | 4.58 | 1.83 | 0.002 | 0.7 | 1.83 | — | 0.18 | — | — | 1360 |
| 45 | 91.58 | 4.58 | 1.83 | 0.002 | 0.3 | 1.83 | — | 0.18 | — | — | 1340 |
| 46 | 91.58 | 4.58 | 1.83 | 0.002 | 0 | 1.83 | — | 0.18 | — | — | 1340 |

*BCG: {Ba$_A$, Ca$_{(1-A)}$}SiO$_3$

As the starting materials, BaTiO$_3$ is used, which is obtained by blending BaO and TiO$_2$ at molar ratio of 1:1 and by chemical reaction at 900° C. to 1200° C. As this BaTiO$_3$, powder (50% of the particles being in particle size 0.8μ to 1.2μ) prepared by solution method, or BaTiO$_3$ obtained from BaCO$_3$ and TiO$_2$ pulverized by atomizer to particle size of about 1 μm may be used.

(2) Wet mixing and pulverizing are performed.

(3) Dehydration and drying are performed.

(4) Adequate quantity of organic binder is added and mixed to turn it to enameled.

(5) The material thus prepared is coated on film in thickness of 20 μm by doctor blade method, and dielectric ceramic composition sheet is prepared.

(6) Nickel paste used as the material for internal electrode is printed on the dielectric ceramic composition sheet.

(7) This is laminated in five layers and thermally pressed to prepare a multilayer product.

(8) The multilayer product thus prepared is cut into 3216 shape, i.e. in size of 3.2 mm (length)×1.6 mm.

(9) Stabilizing at 250° C. to 300° C., binder removal processing is performed for 10 hours.

(10) Oxygen partial pressure is controlled to $7 \times 10^{-9}$ to $9 \times 10^{-13}$ atm, and stabilizing at firing temperature $T_2 = 1,200°$ C. to 1,300° C., it is fired for 2 hours.

(11) Stabilizing at 700° C. to 1,200° C. in neutral atmosphere, re-oxidation is performed for 9 hours.

(12) A terminal electrode of indium-gallium (In—Ga) alloy is mounted on it.

The capacitor thus prepared has capacitance of 20 pF in each layer, being 100 pF in total.

On the specimen capacitors prepared as above, electrical properties such as dielectric constant εs, dielectric loss tan δ, insulation resistance IR (Ω), temperature characteristic of capacitance T.C (%), and life time μ (hour) were determined. The results are shown in Tables 3 and 4.

TABLE 3

| No. | εs | tan δ | IR (Ω) | T.C (%) −55° C. | −25° C. | 85° C. | 125° C. | μ (hour) |
|---|---|---|---|---|---|---|---|---|
| 1 | | | | Difficult to sinter | | | | |
| 2 | 3390 | 2.6 | 5 × 10$^{10}$ | −13.2 | −8.0 | −8.5 | −1.0 | 3 |
| 3 | 3800 | 2.2 | 8 × 10$^{10}$ | −5.0 | −4.0 | 0 | 6.0 | 4 |
| 4 | 3920 | 2.8 | 2 × 10$^{10}$ | −16.8 | −12.7 | −7.0 | −1.3 | 9 |
| 5 | 3600 | 1.9 | 5 × 10$^{11}$ | −13.2 | −7.8 | −5.4 | 2.0 | 100 |
| 6 | 2100 | 2.3 | 5 × 10$^{9}$ | −12.0 | −7.5 | −5.4 | −3.1 | 7 |
| 7 | 1400 | 5.4 | 8 × 10$^{7}$ | −10.9 | −6.0 | −1.0 | 2.8 | 3 |
| 8 | 3100 | 2.0 | 2 × 10$^{11}$ | −14.2 | −9.0 | −4.0 | −1.0 | 90 |
| 9 | 2900 | 1.8 | 3 × 10$^{11}$ | −8.0 | −5.3 | −8.5 | −4.0 | 34 |
| 10 | 3250 | 1.8 | 3 × 10$^{11}$ | −8.4 | −5.8 | −6.4 | −1.7 | 31 |
| 11 | 2560 | 1.6 | 1 × 10$^{11}$ | −7.6 | −5.3 | −9.6 | −8.7 | 37 |
| 12 | 1810 | 1.4 | 1 × 10$^{11}$ | −8.9 | −5.3 | −11.4 | −13.4 | 0 |
| 13 | 2820 | 2.2 | 2 × 10$^{11}$ | −15.0 | −9.8 | −1.1 | 2.0 | 36 |
| 14 | 3180 | 2.6 | 2 × 10$^{11}$ | −14.8 | −8.7 | 3.7 | 0 | 29 |
| 15 | 3790 | 5.9 | 2 × 20$^{11}$ | −17.8 | −11.9 | −1.0 | 2.0 | 45 |
| 16 | | | | Turned to semiconductor state | | | | |
| 17 | 3000 | 1.8 | 2 × 10$^{10}$ | −14.8 | −9.8 | 0 | 12.5 | 39 |
| 18 | 3180 | 1.8 | 3 × 10$^{11}$ | −8.6 | −6.2 | −5.1 | 1.0 | 60 |
| 19 | 3050 | 2.2 | 1 × 10$^{11}$ | −10.2 | −6.1 | −7.8 | −3.7 | 48 |
| 20 | 2480 | 1.5 | 2 × 10$^{11}$ | −11.7 | −8.4 | −4.4 | 4.6 | 200 |
| 21 | 3210 | 2.0 | 2 × 10$^{11}$ | −7.4 | −5.1 | −6.3 | 0 | 25 |
| 22 | 2800 | 2.2 | 3 × 10$^{10}$ | −8.3 | −6.1 | −6.4 | 1.0 | 150 |
| 23 | 3000 | 2.2 | 1 × 10$^{11}$ | −5.7 | −3.3 | −7.8 | −3.8 | 110 |

TABLE 4

| No. | εs | tan δ | IR (Ω) | T.C (%) −55° C. | −25° C. | 85° C. | 125° C. | μ (hour) |
|---|---|---|---|---|---|---|---|---|
| 24 | 3180 | 2.1 | 2 × 10$^{11}$ | −8.5 | −5.0 | −5.0 | 4.0 | 52 |
| 25 | 3260 | 2.1 | 1 × 10$^{11}$ | −7.9 | −5.5 | −6.2 | 2.0 | 100 |
| 26 | 2480 | 1.8 | 8 × 10$^{9}$ | −10.6 | −7.9 | −6.1 | 0 | 6 |
| 27 | 3100 | 1.9 | 3 × 10$^{10}$ | −8.5 | −6.2 | −7.5 | −3.2 | 200 |
| 28 | 3010 | 3.0 | 2 × 10$^{11}$ | −15.0 | −9.8 | −2.4 | −3.4 | 33 |
| 29 | 3150 | 2.0 | 3 × 10$^{11}$ | −8.5 | −5.9 | −6.3 | −2.0 | 28 |
| 30 | 2950 | 1.9 | 2 × 10$^{11}$ | −10.5 | −8.7 | −4.4 | −5.0 | 25 |
| 31 | 2650 | 1.6 | 3 × 10$^{11}$ | −7.5 | −5.4 | −3.8 | −9.0 | 46 |
| 32 | | | | Turned to semiconductor state | | | | |
| 33 | 4330 | 5.2 | 1 × 10$^{11}$ | −35.2 | −20.0 | −11.3 | −18.5 | 8 |
| 34 | 3210 | 1.7 | 3 × 10$^{11}$ | −15.0 | −10.0 | 0 | 7.5 | 28 |

TABLE 4-continued

| No. | $\epsilon s$ | IR tan δ | ($\Omega$) | T.C (%) −55° C. | −25° C. | 85° C. | 125° C. | $\mu$ (hour) |
|---|---|---|---|---|---|---|---|---|
| 35 | 2880 | 1.9 | $1 \times 10^{11}$ | −13.0 | −6.1 | −6.5 | −4.0 | 40 |
| 36 | 2610 | 1.6 | $2 \times 10^{11}$ | −8.9 | −7.0 | −6.0 | −5.5 | 38 |
| 37 | 1910 | 1.4 | $3 \times 10^{11}$ | −5.0 | −4.0 | −3.0 | −5.0 | 9 |
| 38 | 2680 | 1.2 | $2 \times 10^{10}$ | −6.9 | −3.5 | −2.5 | −4.8 | 85 |
| 39 | 1380 | 1.0 | $4 \times 10^{9}$ | −4.6 | −2.6 | −8.0 | −9.0 | 7 |
| 40 | 3080 | 1.9 | $1 \times 10^{11}$ | −13.8 | −10.0 | −9.0 | −8.5 | 35 |
| 41 | 2980 | 2.0 | $7 \times 10^{10}$ | −11.8 | −7.4 | −4.6 | −1.9 | 36 |
| 42 | 3850 | 3.0 | $4 \times 10^{10}$ | −14.9 | −8.9 | −7.8 | −4.0 | 40 |
| 43 | 3160 | 2.2 | $2 \times 10^{11}$ | −11.5 | −9.0 | −2.0 | −7.0 | 35 |
| 44 | 3120 | 2.0 | $1 \times 10^{11}$ | −10.6 | −8.4 | −4.9 | −5.0 | 30 |
| 45 | 3000 | 2.0 | $3 \times 10^{11}$ | −14.5 | −10.0 | −7.0 | −8.5 | 25 |
| 46 | 2850 | 1.4 | $3 \times 10^{11}$ | −14.9 | −9.8 | −5.0 | −9.8 | 26 |

Here, dielectric constant $\epsilon$ s and dielectric loss tan δ are the values at 20° C. and frequency of 1 kHz. The insulation resistance IR is measured at 20° C. after voltage of 50 V has been applied for 30 seconds, and temperature characteristic of capacitance T.C is temperature characteristic to capacitance at 20° C. of the capacitance at each temperature, and life time $\mu$ is accelerated life time, applying voltage of 200V at 200° C.

In the evaluation of the above measurements, the values were considered as satisfactory if dielectric constant $\epsilon$ s is 2,500 or more, dielectric loss tan δ is 3.0 or less, insulation resistance IR is $10^{10}\Omega$ or more, temperature characteristic of capacitance T.C is within ±15%, and life time $\mu$ is 10 hours or more. If the values do not comply with these criteria, the product was considered as defective.

The product which was difficult to sinter or was turned to semiconductor state was considered as defective because such is not suitable for the use as capacitor.

As the result of the evaluation in accordance with the above criteria, the specimens Nos. 5, 8, 9, 10, 11, 13, 14, 17, 18, 19, 21, 22, 23, 24, 25, 27, 28, 29, 30, 31, 34, 35, 36, 38, 40, 41, 42, 43, 44, 45, and 46 were judged as satisfactory, and the specimens Nos. 1, 2, 3, 4, 6, 7, 12, 15, 16, 20, 26, 32, 33, 37, and 39 were judged as defective.

Based on the results of the above judgment, the composition range is defined as follows:

In case $Y_2O_3$ is less than 0.01 mol % (specimen No. 1), it is difficult to sinter even when the firing temperature ($T_2$) = 1,400° C. and is not suitable for practical use. In case it exceeds 10.0 mol % (specimen No. 32), the composition is reduced and is turned to semiconductor state. Thus, it does not act as a dielectric substance.

Therefore, to obtain satisfactory results, $Y_2O_3$ must be within the range of 0.01 to 10.0 mol %.

In case MgO is contained by less than 0.01 mol % (specimens Nos. 4 and 15), temperature characteristic of capacitance T.C is aggravated to more than ±15%, and dielectric loss δ may be as high as 5.9. In case it exceeds 10.0 mols (specimen No. 12), accelerated life time is extremely aggravated.

Therefore, to obtain satisfactory results, MgO must be within the range of 0.01 to 10.0 mol %.

When $V_2O_3$ is added by more than 0.001 mol % (all specimens except Nos. 2, 3, 12 and 16), accelerated life time is extensively improved. In case it is added by more than 0.20 mol % (specimens Nos. 6, 7 and 26), dielectric constant $\epsilon$ s is 2500 or less and insulation resistance is $1 \times 10^{10} \Omega$ or less, and the product is not suitable for practical use.

Therefore, to obtain satisfactory results, $V_2O_5$ must be within the range of 0.001 to 0.20 mol %.

In case $\{Ba_A, Ca_{(1-A)}\}SiO_3$ (where $0 \leq A \leq 1$) is added by less than 0.5 mol % (specimen No. 33) as the additive BCG, temperature characteristic of capacitance is more than ±15%. In case it exceeds 10 mol % (specimen No. 37), $\epsilon$ s is 2500 or less.

Therefore, to obtain satisfactory results, the additive BCG must be within 0.5 to 10 mol %.

In case total quantity of $MnO.Cr_2O_3.Co_2O_3$ is less than 0.01 mol % (specimen No. 16), the composition is turned to semiconductor state. In case it exceeds 1.0 mol % (specimen No. 39), insulation resistance is $1 \times 10^{10} \Omega$ or less.

Therefore, to obtain satisfactory results, total quantity of $MnO.Cr_2O_3.Co_2O_3$ must be within the range of 0.01 to 1.0 mol %.

By the non-reducing dielectric ceramic composition according to the Present invention within composition range as described above, it is possible to obtain multilayer ceramic capacitor, in which decrease of specific resistance and shortening of service life due to reduction of dielectric ceramic composition, even when nickel used as internal electrode is fired in neutral or reducing atmosphere to prevent oxidation and capacitance does not vary extensively due to temperature change.

What we claim are:

1. A non-reducing dielectric ceramic composition, comprising:
   6.32 to 97.64 mols of $BaTiO_3$;
   0.01 to 10.00 mols of $Y_2O_3$:
   0.01 to 10.00 mols of MgO; and
   0.001 to 0.200 mol of $V_2O_5$.

2. A non-reducing dielectric ceramic composition according to claim 1 further comprising
   0.01 to 1.0 mol % of at least one or more of MnO, $Cr_2O_3$, or $Co_2O_3$.

3. A non-reducing dielectric ceramic composition according to claim 1 further comprising
   0.5 to 10.0 mol % of $\{Ba_A, Ca_{(1-A)}\}SiO_3$ (where $0 \leq A \leq 1$).

4. A non-reducing dielectric ceramic composition according to claim 2 further comprising
   0.5 to 10.0 mol % of $\{Ba_A, Ca_{(1-A)}\}SiO_3$ (where $0 \leq A \leq 1$).

* * * * *